US012674078B2

(12) United States Patent (10) Patent No.: US 12,674,078 B2
Kono (45) Date of Patent: Jul. 7, 2026

(54) DOUBLE-SIDED ADHESIVE TAPE AND METHOD OF MAKING AND DISASSEMBLING SAME

(71) Applicant: 3M INNOVATIVE PROPERTIES COMPANY, St. Paul, MN (US)

(72) Inventor: Yasuhiro Kono, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 101 days.

(21) Appl. No.: 17/757,962

(22) PCT Filed: Dec. 18, 2020

(86) PCT No.: PCT/IB2020/062248
§ 371 (c)(1),
(2) Date: Jun. 24, 2022

(87) PCT Pub. No.: WO2021/130642
PCT Pub. Date: Jul. 1, 2021

(65) Prior Publication Data
US 2023/0029711 A1 Feb. 2, 2023

(30) Foreign Application Priority Data

Dec. 27, 2019 (JP) .................................. 2019-238606

(51) Int. Cl.
*C09J 5/08* (2006.01)
*C09J 7/29* (2018.01)
(52) U.S. Cl.
CPC . *C09J 5/08* (2013.01); *C09J 7/29* (2018.01); *C09J 2301/1242* (2020.08); *C09J 2301/41* (2020.08); *C09J 2301/502* (2020.08)

(58) Field of Classification Search
CPC ................ B32B 43/006; B32B 2405/00; C09J 2301/124; C09J 2301/1242;
(Continued)

(56) References Cited

U.S. PATENT DOCUMENTS 4,260,659 A * 4/1981 Gobran ....................... C09J 7/38
442/151
4,925,714 A * 5/1990 Freedman .............. B31D 1/021
428/41.9
(Continued)

FOREIGN PATENT DOCUMENTS

JP 2003147292 A 5/2003
JP 2010095722 A 4/2010
(Continued)

OTHER PUBLICATIONS

English machine translation of WO2019/020187 (Year: 2019).*
International Search report for PCT International Application No. PCT/IB2020/062248, mailed on Mar. 19, 2021, 5 pages.

*Primary Examiner* — Scott W Dodds
(74) *Attorney, Agent, or Firm* — Kathleen B. Gross; Melissa E. Buss

(57) ABSTRACT

To provide a double-sided adhesive tape that achieves both high adhesive force and excellent easy disassembly properties. The double-sided adhesive tape includes a first adhesive layer; an intermediate layer provided on the first adhesive layer and containing a pigment and a binder resin; a film-like substrate stacked directly on the intermediate layer; and a second adhesive layer provided on the film-like substrate, in which the content of the pigment is from 1 to 85 wt % based on the total mass of the intermediate layer.

20 Claims, 3 Drawing Sheets

(58) Field of Classification Search
CPC . C09J 2301/502; C09J 7/29; C09J 7/38; C09J
7/203; C09J 5/08
See application file for complete search history.

(56) References Cited

U.S. PATENT DOCUMENTS

| | | | | |
|---|---|---|---|---|
| 5,658,630 | A * | 8/1997 | Shizukuda | C08F 220/1808 |
| | | | | 428/40.9 |
| 6,740,379 | B1 * | 5/2004 | Congard | C09J 7/22 |
| | | | | 156/247 |
| 10,640,684 | B2 * | 5/2020 | Lee | C09J 7/29 |
| 11,634,020 | B2 | 4/2023 | Shepherd et al. | |
| 2001/0041261 | A1 * | 11/2001 | Tozuka | C09J 7/38 |
| | | | | 428/349 |
| 2010/0104853 | A1 | 4/2010 | Yoo et al. | |
| 2012/0064338 | A1 | 3/2012 | Niimi et al. | |
| 2014/0065416 | A1 * | 3/2014 | Niwa | B32B 27/308 |
| | | | | 156/701 |
| 2015/0184038 | A1 * | 7/2015 | Schaner | B65C 9/0015 |
| | | | | 525/123 |
| 2018/0117885 | A1 | 5/2018 | Kim et al. | |
| 2018/0244487 | A1 * | 8/2018 | Zhao | B65H 35/004 |
| 2024/0352282 | A1 | 10/2024 | Kono | |

FOREIGN PATENT DOCUMENTS

| | | | |
|---|---|---|---|
| JP | 2011052056 A | 3/2011 | |
| JP | 2012077310 A | 4/2012 | |
| JP | 5746828 B2 | 7/2015 | |
| JP | 2016079361 A | 5/2016 | |
| JP | 2019026824 A | 2/2019 | |
| WO | 2007062691 A1 | 6/2007 | |
| WO | 2017109927 A | 6/2017 | |
| WO | WO-2019020187 A1 * | 1/2019 | C09J 7/29 |

* cited by examiner

1

DOUBLE-SIDED ADHESIVE TAPE AND METHOD OF MAKING AND DISASSEMBLING SAME

TECHNICAL FIELD

The present invention relates to a double-sided adhesive tape, and methods of making and disassembling the same.

BACKGROUND

Double-sided adhesive materials have been previously used to fix various members, and improvements in the adhesive force and holding power have been investigated. For example, Patent Document 1 discloses a foam tape including a corona-treated foam and an adhesive layer formed on one or both surfaces thereof.

CITATION LIST

Patent Literature

Patent Document 1: JP 2010-95722 A

SUMMARY

Technical Problem

As one form of a double-sided adhesive tape having high versatility, there is a demand for a double-sided adhesive tape that can firmly adhere two or more adherends and that can be easily disassembled as desired. However, when a strong adhesive force to the adherend is ensured, disassembly after affixing tends to become difficult. Furthermore, when the peelability of the double-sided adhesive tape is improved to ensure the disassembly properties, the adhesive force tends to be insufficient.

Therefore, an object of the present invention is to provide a double-sided adhesive tape that achieves both high adhesive force and excellent easy disassembly properties.

Solution to Problem

One aspect of the present invention relates to a double-sided adhesive tape including: a first adhesive layer; an intermediate layer provided on the first adhesive layer and containing a pigment and a binder resin; a film-like substrate stacked directly on the intermediate layer; and a second adhesive layer provided on the film-like substrate, in which the content of the pigment is from 1 to 85 wt % based on the total mass of the intermediate layer.

With the double-sided adhesive tape described above, two or more adherends can be firmly adhered by the first adhesive layer and the second adhesive layer. Furthermore, the double-sided adhesive tape can easily separate and disassemble the adherends by inserting a flat tool from the side surface of the tape and peeling the interface between the intermediate layer and the film-like substrate.

In one aspect, the first adhesive layer may be a foam.

In one aspect, the binder resin may contain a urethane resin.

Another aspect of the present invention relates to a method of making the double-sided adhesive tape, the method including: an intermediate layer forming step of applying a coating solution containing a pigment and a binder resin directly on one surface of a film-like substrate to form an intermediate layer containing the pigment and the binder resin; and a first adhesive layer forming step of stacking a first adhesive layer on the intermediate layer.

The method of making according to one aspect may further include a stack preparation step of preparing a stack including the film-like substrate and a second adhesive layer provided on one face of the film-like substrate, and at this time, the intermediate layer forming step may be a step of applying the coating solution directly on the other face of the film-like substrate in the stack to form the intermediate layer.

Yet another aspect of the present invention relates to a method of disassembling two or more members bonded by the double-sided adhesive tape, the method comprising a step of inserting a flat tool from a side surface of the double-sided adhesive tape, and peeling an interface between the intermediate layer and the film-like substrate.

Advantageous Effects of Invention

According to the present invention, a double-sided adhesive tape that achieves both high adhesive force and excellent easy disassembly properties is provided. In addition, according to the present invention, a method of making the double-sided adhesive tape, and a method of disassembling members adhered by the double-sided adhesive tape are provided.

DETAILED DESCRIPTION

Figure 1:
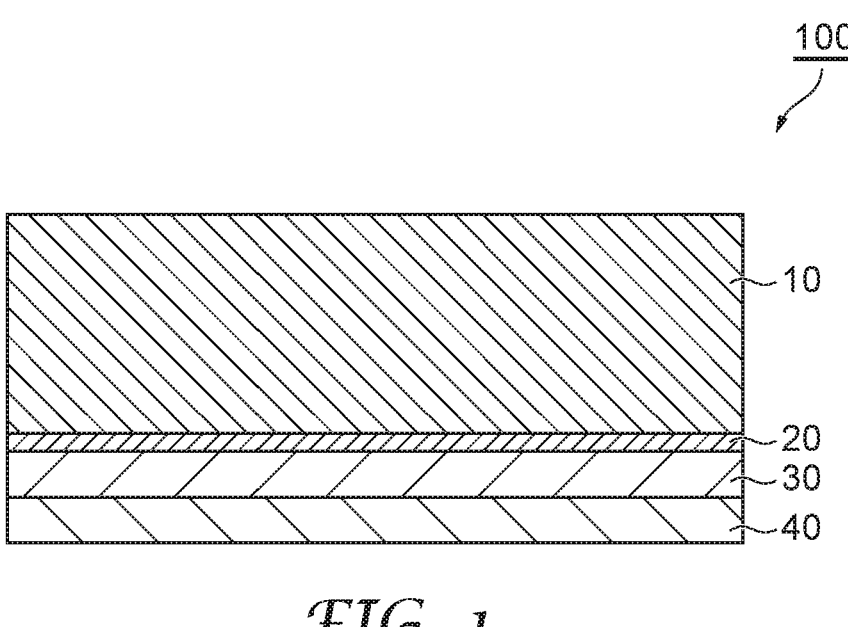
FIG. 1 is a schematic cross-sectional view illustrating a double-sided adhesive tape according to an embodiment.

Preferred embodiments of the present invention are described below with reference to the drawings. Note that, for the sake of better understanding, a part of the drawings is illustrated with exaggeration, and a ratio of dimensions or the like is not limited to that illustrated in the drawings. Double-Sided Adhesive Tape FIG. 1 is a schematic cross-sectional view illustrating a double-sided adhesive tape according to the present embodiment. A double-sided adhesive tape 100 includes a first adhesive layer 10, an intermediate layer 20 provided on the first adhesive layer 10 and containing a pigment and a binder resin, a film-like substrate 30 stacked directly on the intermediate layer 20, and a second adhesive layer 40 provided on the film-like substrate 30. With the double-sided adhesive tape 100 according to the present embodiment, an assembly including two or more members can be made by bonding a member to each of the first adhesive layer 10 and the second adhesive layer 40, for example. Then, with the double-sided adhesive tape 100 according to the present embodiment, the assembly can be easily disassembled by inserting a flat tool from a side surface of the double-sided adhesive tape 100, and peeling an interface between the intermediate layer 20 and the film-like substrate 30.

The first adhesive layer 10 is a layer constituted primarily of an adhesive, and can be referred to as a layer containing an adhesive. The adhesive constituting the first adhesive layer 10 may be, for example, an acrylic-based adhesive, a rubber-based adhesive, a urethane-based adhesive, a silicon-based adhesive agent, a block copolymer-based adhesive, or the like, and is preferably an acrylic-based adhesive. The first adhesive layer 10 may be a layer containing a type of adhesive, or may be a layer containing two or more types of adhesive. The first adhesive layer may have one layer or a plurality of layers.

The first adhesive layer 10 is preferably a foam. This makes it easier to ensure a layer thickness that facilitates disassembly while maintaining sufficient bonding strength. Note that "the first adhesive layer 10 is a foam" means that at least a portion of the first adhesive layer 10 is a foam. As a foam acrylate adhesive layer, for example, the technique disclosed in U.S. Pat. No. 5,746,828 is applicable.

As the first adhesive layer 10, for example, a commercially available foam tape can be used. Examples of commercially available foam tapes include Y-4825, Y-4950, Y-4180, Y-4930, Y-4920, Y-4914, and Y-4300 (all manufactured by 3M Company).

The thickness of the first adhesive layer 10 (thickness of the entire first adhesive layer when the first adhesive layer is formed of a plurality of layers) may be, for example, greater than or equal to 0.15 mm, preferably greater than or equal to 0.2 mm, and more preferably greater than or equal to 0.4 mm. As a result, the flat tool is easily inserted from the side surface of the tape, and the member bonded by the double-sided adhesive tape 100 is more easily disassembled. The thickness of the first adhesive layer 10 is, for example, less than or equal to 100 mm, preferably less than or equal to 10 mm and more preferably less than or equal to 2 mm. With this configuration, bonding strength of the first adhesive layer 10 tends to be further enhanced.

The intermediate layer 20 is a layer that is provided on the surface of the film-like substrate 30 and is bonded to the film-like substrate 30. In addition, the intermediate layer 20 is a layer that is peeled off from the surface of the film-like substrate 30 when the assembly bonded by the double-sided adhesive tape 100 is disassembled.

The intermediate layer 20 contains a pigment and a binder resin, and for example, ink is applicable. By providing the intermediate layer 20 containing the pigment and the binder resin, the double-sided adhesive tape 100 can achieve both high adhesive force and excellent easy disassembly properties. More specifically, it is thought that the intermediate layer 20 firmly bonds to the film-like substrate 30 due to the contribution of the binder resin, while the pigment becomes a starting point of peeling when the flat tool is inserted, which facilitates peeling from the film-like substrate 30. In addition, since the intermediate layer 20 contains a pigment, when the flat tool is inserted into the side surface of the tape, coloration of the intermediate layer 20 may be a measure of the insertion position depending on the color of the adhesive layer and the color of the adherend, and therefore, workability is improved.

Examples of the pigment include inorganic pigments such as carbon black, titanium oxide, aluminum hydroxide, and silica; and organic pigments such as (metal) phthalocyanine-based pigment and quinacridone-based pigment. These may be used alone or two or more types may be used in combination.

The binder resin may contain a resin having a glass transition temperature of less than or equal to 0° C. from the perspective of further improving the adhesive force to the film-like substrate. The glass transition temperature of the resin contained in the binder resin may be, for example, less than or equal to −10° C., less than or equal to −20° C., or less than or equal to −30° C. The glass transition temperature of the resin contained in the binder resin may be greater than or equal to −70° C., or greater than or equal to −60° C.

The binder resin may be a urethane resin (polyurethane resin), a polyurea resin, an acrylic resin (polyacrylate resin), a polyester resin, or a polyamide resin. Inks on the market often contain a urethane resin.

The intermediate layer 20 can be formed using a commercially available ink containing a pigment and a binder resin. Examples of commercially available inks include R indigo blue 800, R white 110, R black 1000, R magenta 365 of Lamiall Mark III series (manufactured by SAKATA INX CORPORATION), and SR701R white, SR794 black, SR795 black of Lamic series (manufactured by Dainichiseika Color & Chemicals Mfg. Co., Ltd). Among these inks, R indigo blue 800, R white 110, and R black 1000 of Lamiall Mark III series are preferable from the perspective of achieving more excellent disassembly properties. The intermediate layer 20 may be formed of one type of ink or may be formed of two or more types of ink.

The thickness of the intermediate layer 20 is, for example, greater than or equal to 0.01 μm, preferably greater than or equal to 0.1 μm, and more preferably greater than or equal to 0.5 μm. The thickness of the first adhesive layer 10 is, for example, less than or equal to 5 μm, preferably less than or equal to 3 μm, and more preferably less than or equal to 2 μm.

The content of the pigment in the intermediate layer 20 may be greater than or equal to 1 wt %, greater than or equal to 10 wt %, or greater than or equal to 20 wt %, based on the total mass of the intermediate layer 20, from the perspective of obtaining excellent peeling characteristics. Furthermore, the content thereof may be less than or equal to 85 wt %, less than or equal to 80 wt %, or less than or equal to 70 wt %, from the perspective of preventing pigments from adhering to other materials, manufacturing machines, and the like in the manufacturing process.

A second intermediate layer that bonds the intermediate layer 20 (first intermediate layer) and the first adhesive layer 10 may be further provided on a surface of the intermediate layer 20 on the side opposite the film-like substrate 30 (i.e., the surface on the first adhesive layer 10 side).

The second intermediate layer may be, for example, a layer containing a binder resin, a layer containing a pigment and a binder resin, or a layer containing a pigment and a crosslinked body of a binder resin. Examples of the binder resin and the pigment in the second intermediate layer may include the same as the binder resin and the pigment in the intermediate layer 20.

The crosslinked body of the binder resin can be a cured body obtained by curing a binder resin with a curing agent. The curing agent may be selected as appropriate depending on the type of the binder resin, and when the binder resin contains a urethane resin, Coronate L45 (manufactured by Soken Chemical & Engineering Co., Ltd.) or the like may be used as the curing agent.

The thickness of the second intermediate layer is, for example, greater than or equal to 0.01 μm, preferably greater than or equal to 0.1 μm, and more preferably greater than or equal to 0.5 μm. The thickness of the first adhesive layer 10 is, for example, less than or equal to 5 μm, preferably less than or equal to 3 μm, and more preferably less than or equal to 2 μm.

The film-like substrate 30 is a layer provided between the intermediate layer 20 and the second adhesive layer 40. The surface of the film-like substrate 30 that bonds the second adhesive layer 40 may be corona-treated.

The material of the film-like substrate 30 is not particularly limited, and may be, for example, a resin such as polyethylene terephthalate (PET), polyethylene naphthalate (PEN), polyethylene (PE), polypropylene (PP), acrylic, polyimide (PI), polyphenylene sulfide (PPS), polycarbonate (PC), and the like.

The thickness of the film-like substrate 30 may be, for example, greater than or equal to 10 μm, greater than or equal to 12 μm, greater than or equal to 25 μm, or greater than or equal to 38 μm. The thickness of the film-like substrate 30 may be, for example, less than or equal to 100 μm, less than or equal to 75 μm, or less than or equal to 50 μm.

The second adhesive layer 40 is a layer mainly composed of an adhesive, and can be referred to as a layer containing an adhesive. The adhesive constituting the second adhesive layer 40 may be, for example, an acrylic-based adhesive, a rubber-based adhesive, a urethane-based adhesive, a silicon-based adhesive agent, a block copolymer-based adhesive, or the like, and is preferably an acrylic-based adhesive. The second adhesive layer 40 may be a layer containing a type of adhesive, or may be a layer containing two or more types of adhesive. The second adhesive layer 40 may be a foam. The second adhesive layer may have one layer or a plurality of layers.

The thickness of the second adhesive layer 40 (thickness of the entire second adhesive layer when the second adhesive layer is formed of a plurality of layers) is not particularly limited, and may be, for example, greater than or equal to 10 μm, greater than or equal to 20 μm, or greater than or equal to 30 μm. The thickness of the second adhesive layer 40 may be, for example, less than or equal to 100 μm, less than or equal to 80 μm, or less than or equal to 60 μm.

Method of Making Double-Sided Adhesive Tape

Figure 2A:
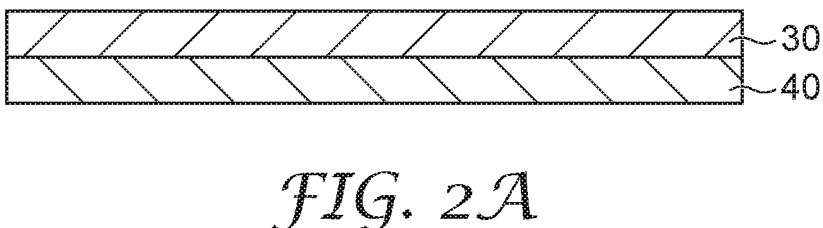
FIGS. 2A-C are schematic views for explaining a method of making a double-sided adhesive tape according to an embodiment.
Figure 2B:
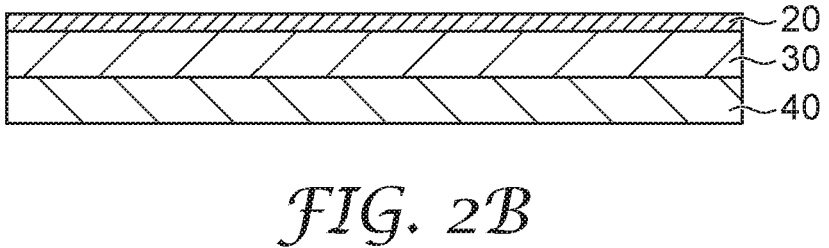
Figure 2C:
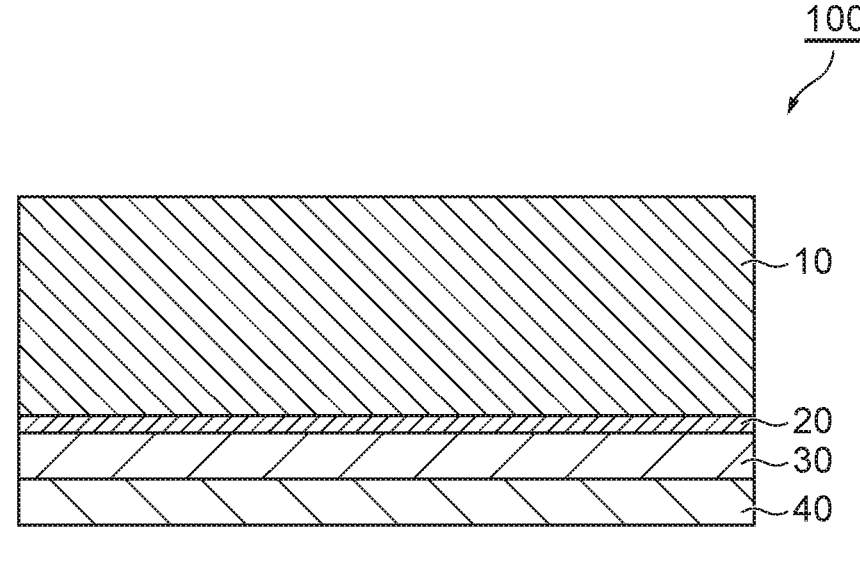

FIGS. 2A-C are schematic views for explaining one embodiment of a method of making the double-sided adhesive tape. The double-sided adhesive tape 100 can be made by the method of making including, for example, an intermediate layer forming step of applying a coating solution containing a pigment and a binder resin directly on one surface of a film-like substrate 30 to form an intermediate layer 20 containing the pigment and the binder resin; and a first adhesive layer forming step of stacking a first adhesive layer 10 on the intermediate layer 20.

Prior to the intermediate layer forming step, the method of making described above may provide a stack preparation step of preparing a stack including the film-like substrate 30 and a second adhesive layer 40 provided on one face of the film-like substrate 30. In this case, the intermediate layer forming step may be a step of applying the coating solution directly on the other face of the film-like substrate 30 in the stack to form the intermediate layer 20. When the stack preparation step is not provided, the second adhesive layer 40 may be formed on the film-like substrate 30 after the intermediate layer forming step. Furthermore, the step of forming the first adhesive layer 10 may be either before or after the step of forming the second adhesive layer 40.

The second adhesive layer 40 can be formed, for example, by applying an adhesive solution for forming a second adhesive layer on a LAB (low adhesion backsize) surface of a liner, and then drying and solidifying the solution. A standard coater, for example, a bar coater, a knife coater, a roll coater, a die coater, or the like, can be used as an application device. Furthermore, the second adhesive layer 40 may be directly applied to the substrate 30.

The film-like substrate 30 is stacked on the surface of the second adhesive layer 40 without the liner. When one surface of the film-like substrate 30 is corona-treated, the bonding between the film-like substrate 30 and the second adhesive layer 40 is preferably performed such that the corona-treated surface of the film-like substrate 30 is on the second adhesive layer 40 side.

The intermediate layer 20 can be formed, for example, by applying a coating solution for forming an intermediate layer on one surface of the film-like substrate 30 (e.g., on a surface not bonded to the second adhesive layer 40), and then drying and solidifying the solution. The method of applying the coating solution is not particularly limited, and the coating solution can be applied by using a gravure coater, spraying the coating solution, or the like. The aforementioned ink can be suitably used as the coating solution.

The first adhesive layer 10 can be formed, for example, by stacking the adhesive layer formed on the LAB surface of the liner onto the intermediate layer 20. The first adhesive layer 10 may be formed by bonding a commercially available foam tape and the intermediate layer 20.

Method of Disassembling Double-Sided Adhesive Tape

Figure 3A:
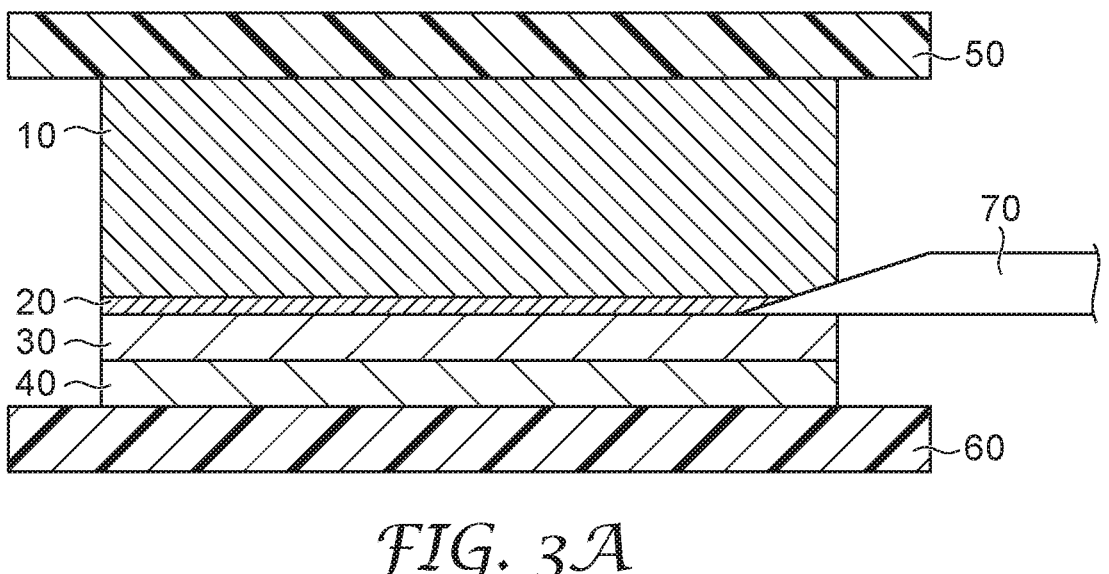
FIGS. 3A-B are schematic views for explaining a method of disassembling a double-sided adhesive tape according to an embodiment.
Figure 3B:
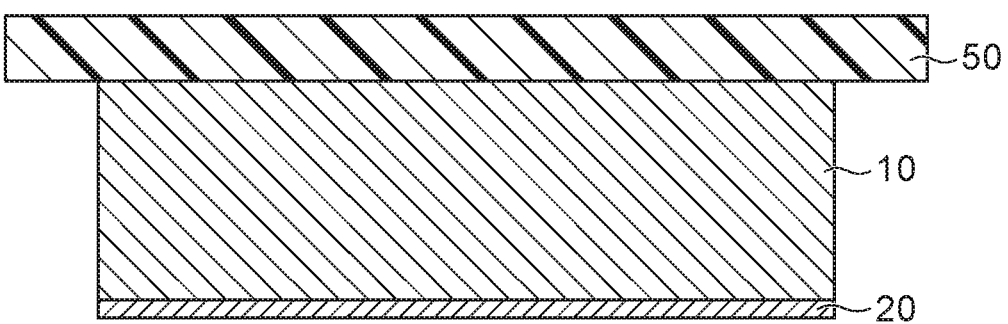
Figure 3B:
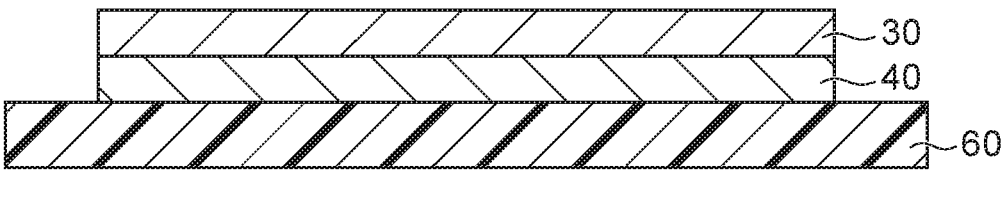

FIGS. 3A-B are schematic views for explaining one embodiment of a method of disassembling the double-sided adhesive tape. The method of disassembling a member 50 and a member 60 that are bonded by the double-sided adhesive tape 100 (also referred to as the method of disassembling an assembly of the member 50 and the member 60) includes, for example, the step of inserting a flat tool 70 from a side surface of the double-sided adhesive tape 100 bonding the member 50 and the member 60, and then peeling the interface between the intermediate layer 20 and the film-like substrate 30.

The flat tool 70 may be an instrument having a flat portion, and examples thereof include a scraper and a knife. The material of the flat tool is not particularly limited, and may be made of metal, resin, or the like.

The assembly to be disassembled is not limited to the one constituted by two members, but may be constituted by three or more members. All the members may be made of the same material, or some or all of them may be made of different materials.

After inserting the flat portion of the flat tool 70 into the side surface of the double-sided adhesive tape 100 so as to be substantially parallel to the interface between the intermediate layer 20 and the film-like substrate 30, for example, the flat portion of the flat tool 70 can be moved along the interface between the intermediate layer 20 and the film-like substrate 30 to efficiently peel the intermediate layer 20 from the film-like substrate 30. Furthermore, by rotating the inserted flat portion, the LAB surface between the intermediate layer 20 and the film-like substrate 30 can be extended and peeled off. Although descriptions were given above for the preferred embodiments of the present invention, the present invention is not limited to the aforementioned embodiments.

EXAMPLES

The content of the present invention will be described more specifically below using Examples and Comparative Examples, but the present invention is not intended to be limited to the following.

Example 1

A PET film (EMBLET S-50 A-Grade, manufactured by UNITIKA LTD.) having a thickness of 50 μm was used as a film-like substrate, and only one surface thereof was corona-treated.

Five grams of a diluent solvent in which methyl ethyl ketone and toluene were mixed at a ratio of 2 to 1 was added to 5 g of ink containing a pigment and a urethane resin (Lamiall Mark III R indigo blue 800 manufactured by SAKATA INX CORPORATION, Tg of urethane resin (measured value): −53° C.) and stirred, and thereby a coating solution for forming an intermediate layer was prepared. The obtained coating solution was applied to a corona-untreated surface of a film-like substrate using a wire bar (Select Roller OSP-25, manufactured by OSG Corporation). The film-like substrate to which the coating solution was applied was dried in a dryer at 65° C. for 1 minute, and an intermediate layer (content of the pigment in the intermediate layer (calculated value): 41 to 55 wt %) having a thickness of 1 to 2 μm was formed on a surface of the film-like substrate.

Added was 3 g of a curing agent (Coronate L-45, manufactured by Soken Chemical & Engineering Co., Ltd.) to 100 g of an adhesive (SK-Dyne1503 manufactured by Soken Chemical & Engineering Co., Ltd.) and stirred to thereby obtain an adhesive composition. The adhesive composition obtained by a knife coater was applied to a silicon peeling-treated surface of a PET film (FILMBYNA 100E-0010 DG-2, manufactured by FUJIMORI KOGYO CO., LTD.), and dried in a dryer at 65° C. for 3 minutes to thereby obtain a second adhesive layer having a thickness of 50 μm.

The second adhesive layer and the surface on which the intermediate layer of the film-like substrate was not formed were laminated while being pressure-bonded so that air bubbles did not enter therebetween, to obtain a stack in which the intermediate layer, the film-like substrate, and the second adhesive layer were stacked in this order. The surface of the obtained stack that was not bonded to the film-like substrate on the intermediate layer was covered with an adhesive layer of a foam tape (Y-4825K-08, manufactured by 3M Company) having a thickness of 0.8 mm so as to prevent air bubbles from entering, to thereby form a first adhesive layer, and pressure bonding was performed using a squeegee to produce a double-sided adhesive tape.

The obtained double-sided adhesive tape was evaluated for tensile shear force, peel force, holding power, and peeling characteristics in the following manner.

Tensile Shear Force

In accordance with JIS Z 1541 (2009), a double-sided adhesive tape having a size of 15 mm×15 mm was affixed to a stainless steel plate (SUS304 BA) in an environment of 24° C., and the maximum value of the tensile shear force was measured at a tension rate of 50 mm/min.

Peel Force

Prepared were two T-shaped blocks made of aluminum, in which an adherend surface had a size of 25 mm×25 mm, a gripping portion extending vertically from the adherend surface had a size of 20 mm, and each portion had a thickness of 5 mm, and a double-sided adhesive tape having a size of 15×15 mm was affixed to the center of one of the T-shaped blocks. The other T-shaped block was affixed to the surface of the double-sided adhesive tape that was not affixed to the T-shaped block so as to cross the gripping portions of the blocks with each other. In an environment of 24° C., a 5 kg weight was placed on the gripping portion for 1 minute to be pressure-bonded, and thereafter allowed to stand for 72 hours, and the maximum value of the peel force was measured when the T-shaped blocks were peeled off from each other.

Holding Power

In accordance with JIS Z 1541 (2009), a double-sided adhesive tape having a size of 25 mm×25 mm was affixed to a stainless steel plate (SUS304 BA) in an environment of 80° C., a weight of 1 kg was hung from the tape, and a period of time from when the double-sided tape was peeled off until the weight was dropped was measured.

Peeling Characteristics

A 50 mm×100 mm stainless steel plate (SUS304 BA) having a thickness of 1 mm and a float glass plate having a thickness of 2 mm were prepared. The surface of a 5 mm×100 mm double-sided adhesive tape on the first adhesive layer side and the stainless steel plate were affixed along the one end side of the stainless steel plate. The surface of the double-sided adhesive tape on the second adhesive layer side and the float glass plate were affixed so that the float glass plate and the stainless steel plate overlapped. After allowed to stand for 72 hours, the stainless steel plate and the float glass plate were disassembled using a scraper, and the peeling characteristics were evaluated.

A case where the double-sided adhesive tape was easily peeled off at the interface between the intermediate layer and the film-like substrate was evaluated as "AA", a case where the double-sided adhesive tape was peeled off at the interface between the intermediate layer and the film-like substrate was evaluated as "A"; a case where the double-sided adhesive tape was peeled off at the interface between the intermediate layer and the film-like substrate but also partially peeled off at the interface between the adhesive and the adherend was evaluated as "B"; and a case where the double-sided adhesive tape was peeled off mostly at the interface between the adhesive and the adherend was evaluated as "C".

Example 2

A double-sided adhesive tape (content (calculated value) of the pigment in the intermediate layer: 74 to 81 wt %) was produced in the same manner as in Example 1, except that the ink was changed to Lamiall Mark III R white 110 (manufactured by SAKATA INX CORPORATION, Tg measured value of urethane resin: −55° C.) containing a pigment and a urethane resin. Then, each of the characteristics of the tape was measured and evaluated.

Example 3

A double-sided adhesive tape (content (calculated value) of the pigment in the intermediate layer: 32 to 47 wt %) was produced in the same manner as in Example 1, except that the ink was changed to Lamiall Mark III R black 1000 (manufactured by SAKATA INX CORPORATION, Tg measured value of urethane resin: −54° C.) containing a pigment and a urethane resin. Then, each of the characteristics of the tape was measured and evaluated.

Example 4

A double-sided adhesive tape (content (calculated value) of the pigment in the intermediate layer: 25 to 50 wt %) was produced in the same manner as in Example 1, except that the ink was changed to Lamic F220 794 black R (manufactured by Dainichiseika Color & Chemicals Mfg. Co., Ltd., Tg measured value of urethane resin:-42° C.) containing a pigment and a urethane resin. Then, each of the characteristics of the tape was measured and evaluated.

Example 5

A double-sided adhesive tape (content (calculated value) of the pigment in the intermediate layer: 36 to 61 wt %) was produced in the same manner as in Example 1, except that the ink was changed to Lamic F220 795 black R (manufactured by Dainichiseika Color & Chemicals Mfg. Co., Ltd., Tg measured value of urethane resin:-41° C.) containing a pigment and a urethane resin. Then, each of the characteristics of the tape was measured and evaluated.

Example 6

A double-sided adhesive tape (content (calculated value) of the pigment in the intermediate layer: 58 to 69 wt %) was produced in the same manner as in Example 1, except that the ink was changed to a mixture in which Lamiall Mark III R indigo blue 800 and Lamic F220 701 white K-5 (manufactured by Dainichiseika Color & Chemicals Mfg. Co., Ltd., Tg measured value of urethane resin: −41° C.) containing a pigment and a urethane resin were mixed at a ratio of 1 to 1. Then, each of the characteristics of the tape was measured and evaluated.

Example 7

A double-sided adhesive tape (content (calculated value) of the pigment in the intermediate layer: 25 to 46 wt %) was produced in the same manner as in Example 1, except that the ink was changed to Lamic SR739 R indigo blue F-3 (manufactured by Dainichiseika Color & Chemicals Mfg. Co., Ltd., Tg measured value of urethane resin after curing reaction: −19° C.) containing a pigment and a urethane resin, 5 g of a diluent solvent in which methyl ethyl ketone and toluene were mixed at a ratio of 2 to 1 was added to 5 g of the ink and stirred, 0.25 g (5 parts by mass with respect to the ink) of a curing agent (Coronate L-45, manufactured by Soken Chemical & Engineering Co., Ltd.) was further added and stirred, and thereby a coating solution for forming the intermediate layer was prepared. Then, each of the characteristics of the tape was measured and evaluated.

Example 8

A double-sided adhesive tape (content (calculated value) of the pigment in the intermediate layer: 1 wt %) was produced in the same manner as in Example 1, except that while 3.3 g of a binder resin solution (Lamiall Mark III R medium, manufactured by SAKATA INX CORPORATION, solid content: 15 wt %) the solid concentration of which was measured in advance was added in portions to an alumina mortar (inner diameter: 107 mm) containing 5 mg of a pigment (Cyanine Blue 4920, manufactured by Dainichiseika Color & Chemicals Mfg. Co., Ltd.) so that the amount of the pigment was 1 wt % with respect to a total of the solid content and the pigment, the added mixture was ground with a pestle, and while a dilution solvent (methyl ethyl ketone and toluene were mixed at a ratio of 2 to 1) was further added thereto so that the volume of the solution containing the pigment and the binder resin was from 4 to 5 ml, the added mixture was grounded for about 15 minutes, and the obtained mixture was used as the coating solution for forming the intermediate layer. Then, each of the characteristics of the tape was measured and evaluated.

Example 9

To 5 g of ink (Lamic F220 701 white K-5), 5 g of a diluent solvent in which methyl ethyl ketone and toluene were mixed at a ratio of 2 to 1 was added and stirred, and then 0.15 g (3 parts by mass with respect to the ink) of the Coronate L45 was further added and stirred to obtain a second coating solution. In the same manner as in Example 1, except that the second coating liquid was applied to a surface of the intermediate layer (first intermediate layer) that was not bonded to the film-like substrate using a wire bar, and dried in a dryer at 65° C. for 1 minute to form a second intermediate layer having a thickness of 1 μm on the surface of the intermediate layer; and that the first adhesive layer was formed on the surface of the second intermediate layer, a double-sided adhesive tape (content (calculated value) of the pigment in the intermediate layer: 41 to 55 wt %) was produced, and each of the characteristics was measured and evaluated.

Example 10

In the same manner as in Example 9, except that Lamic F220 794 black R was used as the ink that forms the second intermediate layer, a double-sided adhesive tape (content (calculated value) of the pigment in the intermediate layer: 41 to 55 wt %) was produced, and each of the characteristics was measured and evaluated.

Example 11

In the same manner as in Example 9, except that the ink that forms the first intermediate layer was changed to Lamic SR739 indigo blue F-3, a double-sided adhesive tape (content (calculated value) of the pigment in the intermediate layer: 41 to 55 wt %) was produced, and each of the characteristics was measured and evaluated.

Example 12

A double-sided adhesive tape (content (calculated value) of the pigment in the intermediate layer: 25 to 46 wt %) was produced in the same manner as in Example 9, except that 5 g of a diluent solvent in which methyl ethyl ketone and toluene were mixed at a ratio of 2 to 1 was added to 5 g of ink (Lamic SR739 indigo blue F-3) and stirred, 0.25 g (5 parts by mass with respect to the ink) of Coronate L-45 was further added and stirred, and thereby a coating solution for forming the intermediate layer was prepared. Then, each of the characteristics of the tape was measured and evaluated.

Example 13

Production was in the same manner as in Example 1, except that the film-like substrate was changed to PEN film (TEONEX Q51, manufactured by Teijin Ltd.) having a thickness of 25 μm, a double-sided adhesive tape (content (calculated value) of the pigment in the intermediate layer: 41 to 55 wt %) was produced, and each of the characteristics was measured and evaluated.

Example 14

Production was in the same manner as in Example 1, except that the film-like substrate was changed to PI film (KAPTON 100H, manufactured by DU PONT-TORAY CO., LTD.) having a thickness of 25 μm, a double-sided adhesive tape (content (calculated value) of the pigment in the intermediate layer: 41 to 55 wt %) was produced, and each of the characteristics was measured and evaluated.

Example 15

Production was in the same manner as in Example 6, except that a foam tape (Y-4950, manufactured by 3M Company) having a thickness of 1.14 mm was used as the first adhesive layer, and that the measurement of the holding power was performed in an environment of 40° C., a double-sided adhesive tape (content (calculated value) of the pigment in the intermediate layer: 58 to 69 wt %) was produced, and each of the characteristics was measured and evaluated.

Example 16

Production was in the same manner as in Example 6, except that a foam tape (Y-4180-08, manufactured by 3M Company) having a thickness of 0.8 mm was used as the first adhesive layer, and that the measurement of the holding power was performed in an environment of 40° C., a double-sided adhesive tape (content (calculated value) of the pigment in the intermediate layer: 58 to 69 wt %) was produced, and each of the characteristics was measured and evaluated.

Comparative Example 1

Each of the characteristics was evaluated using a foam tape (Y-4825-08) having a thickness of 0.8 mm.

Comparative Example 2

Each of the characteristics was evaluated using a foam tape (Y-4950) having a thickness of 1.14 mm. Note that the holding power was measured in an environment of 40° C.

Comparative Example 3

Each of the characteristics was evaluated using a foam tape (Y-4180-08) having a thickness of 0.8 mm. Note that the holding power was measured in an environment of 40° C.

Comparative Example 4

Each of the characteristics was evaluated using a tape having a thickness of 0.8 mm (Y-4825-08), to one surface of which ink (Lamiall Mark III medium, manufactured by SAKATA INX CORPORATION) was applied so as to have a thickness of 1 to 2 μm.

Comparative Example 5

Production was in the same manner as in Example 8, except that the amount of the pigment was 0.5 wt % with respect to the total of the solid content and the pigment, a double-sided adhesive tape (content (calculated value) of the pigment in the intermediate layer: 0.5 wt %) was produced, and each of the characteristics was measured and evaluated.

Comparative Example 6

A double-sided adhesive tape (content (calculated value) of the pigment in the intermediate layer: 85 wt %) was produced in the same manner as in Example 1, except that while 4.0 g of Lamiall Mark III R white 110TM (solid content: 42 wt %, content of pigment: 78 wt %/solid content) the solid concentration of which was measured in advance was added in portions to an alumina mortar (inner diameter: 107 mm) containing 783 mg of a pigment (Cyanine Blue 4920, manufactured by Dainichiseika Color & Chemicals Mfg. Co., Ltd.) so that the amount of the pigment was 85 wt % with respect to a total of the solid content and the pigment, the added mixture was ground with a pestle, and while a dilution solvent (methyl ethyl ketone and toluene were mixed at a ratio of 2 to 1) was further added thereto so that the volume of the solution containing the pigment and the binder resin was from 8 to 10 ml, the added mixture was grounded for about 15 minutes, and the obtained mixture was used as the coating solution for forming the intermediate layer. Then, each of the characteristics of the tape was measured and evaluated.

Comparative Example 7

Production was in the same manner as in Example 6, except that the amount of the pigment was 90 wt % with respect to the total of the solid content and the pigment, a double-sided adhesive tape (content (calculated value) of the pigment in the intermediate layer: 90 wt %) was produced, and each of the characteristics was measured and evaluated.

Comparative Example 8

Production was in the same manner as in Example 6, except that the amount of the pigment was 95 wt % with respect to the total of the solid content and the pigment, a double-sided adhesive tape (content (calculated value) of the pigment in the intermediate: layer: 95 wt %) was produced, and each of the characteristics was measured and evaluated.

The evaluation results for Examples 1 to 14 and Comparative Examples 1 to 4 are shown in Table 1. Note that the "content of the pigment in the intermediate layer" in Examples was described as the median value of the calculated value based on the product information.

TABLE 1

| | Content of pigment in (first) intermediate layer [mass %] | Tensile shear force [N] | Peel force [N] | Holding power [min] | Peeling characteristics |
|---|---|---|---|---|---|
| Example 1 | 48 | 97 | 100 | >20000 | AA |
| Example 2 | 78 | 141 | 118 | >20000 | AA |
| Example 3 | 40 | 86 | 119 | >20000 | AA |
| Example 4 | 38 | 127 | 127 | >20000 | A |
| Example 5 | 49 | 133 | 133 | >20000 | A |
| Example 6 | 64 | 113 | 124 | >20000 | AA |
| Example 7 | 36 | 222 | 131 | >20000 | AA |
| Example 8 | 1 | 175 | 156 | >20000 | A |
| Example 9 | 48 | 182 | 110 | >20000 | AA |
| Example 10 | 48 | 172 | 110 | >20000 | AA |
| Example 11 | 49 | 118 | 125 | >20000 | AA |
| Example 12 | 36 | 195 | 132 | >20000 | A |
| Example 13 | 48 | 118 | 122 | >20000 | AA |
| Example 14 | 48 | 131 | 116 | >20000 | AA |
| Example 15 | 64 | 128 | 166 | >20000 | AA |
| Example 16 | 64 | 63 | 68 | >20000 | AA |
| Comparative Example 1 | 0 | 174 | 112 | >20000 | C |
| Comparative Example 2] | 0 | 289 | 168 | >20000 | C |
| Comparative Example 3 | 0 | 90 | 75 | >20000 | C |
| Comparative Example 4 | 0 | 121 | 127 | >20000 | B |
| Comparative Example 5 | 0.5 | 192 | 158 | >20000 | B |
| Comparative Example 6 | 85 | 286 | 132 | >20000 | A |

TABLE 1-continued

| | Content of pigment in (first) intermediate layer [mass %] | Tensile shear force [N] | Peel force [N] | Holding power [min] | Peeling characteristics |
|---|---|---|---|---|---|
| Comparative Example 7] | 90 | 235 | 149 | >20000 | A |
| Comparative Example 8] | 95 | 87 | 119 | >20000 | AA |

What is claimed is:

1. A method of disassembling two or more members bonded by a double-sided adhesive tape comprising:
    a first adhesive layer;
    a second adhesive layer; and
    two layers between the first adhesive layer and the second adhesive layer, wherein the two layers are in direct contact with each other, wherein the first adhesive layer is a foam, the second adhesive layer is a foam, or both the first adhesive layer and the second adhesive layer are foams, the method comprising:
    inserting a flat tool from a side surface of the double-sided adhesive tape, and
    peeling an interface between the two layers between the first adhesive layer and the second adhesive layer.

2. The method of claim 1, wherein the first adhesive layer comprises an acrylic-based adhesive, a rubber-based adhesive, a urethane-based adhesive, a silicon-based adhesive agent, a block copolymer-based adhesive, or a combination thereof.

3. The method of claim 1, wherein the first adhesive layer comprises an acrylic-based adhesive.

4. The method of claim 1, wherein the first adhesive layer comprises a plurality of layers.

5. The method of claim 1, wherein the first adhesive layer is a foam.

6. The method of claim 1, wherein the second adhesive layer comprises an acrylic-based adhesive, a rubber-based adhesive, a urethane-based adhesive, a silicon-based adhesive agent, a block copolymer-based adhesive, or a combination thereof.

7. The method of claim 1, wherein the second adhesive layer comprises an acrylic-based adhesive.

8. The method of claim 1, wherein the second adhesive layer is a foam.

9. The method of claim 1, wherein the second adhesive layer comprises a plurality of layers.

10. A method of disassembling two or more members bonded by a double-sided adhesive tape comprising:
    a second adhesive layer;
    a substrate on the second adhesive layer;
    an intermediate layer directly on the substrate; and
    a first adhesive layer on the intermediate layer, wherein the first adhesive layer is a foam, the second adhesive layer is a foam, or both the first adhesive layer and the second adhesive layer are foams,
the method comprising:
    inserting a flat tool from a side surface of the double-sided adhesive tape, and
    peeling an interface between the intermediate layer and the substrate.

11. The method of claim 10, further comprising a second intermediate layer between the intermediate layer and the first adhesive layer.

12. The method of claim 10, wherein the intermediate layer comprises a pigment and a binder resin.

13. The method of claim 12, wherein the pigment is carbon black, titanium oxide, aluminum hydroxide, silica, a phthalocyanine-based pigment, a quinacridone-based pigment, or a combination thereof.

14. The method of claim 12, wherein the binder resin is a polyurethane resin, a polyurea resin, a polyacrylate resin, a polyester resin, or a polyamide resin.

15. The method of claim 12, wherein the binder resin is a polyurethane resin.

16. The method of claim 12, wherein a content of the pigment is from 1 weight percent to 85 weight percent, based on a total mass of the intermediate layer.

17. The method of claim 10, wherein the intermediate layer comprises an ink.

18. The method of claim 10, wherein the substrate comprises polyethylene terephthalate, polyethylene naphthalate, polyethylene, polypropylene, acrylic, polyimide, polyphenylene sulfide, or polycarbonate.

19. The method of claim 10, wherein the substrate is corona-treated.

20. The method of claim 10, wherein a surface of the substrate on the second adhesive layer is corona-treated.

\* \* \* \* \*